United States Patent [19]

Weiner

[11] Patent Number: 5,306,953
[45] Date of Patent: Apr. 26, 1994

[54] REAR VIEW MIRROR POSITIONING AND ALERTING APPARATUS

[76] Inventor: Robert I. Weiner, 305 W. Chesapeake Ave., Towson, Md. 21204

[21] Appl. No.: 923,461

[22] Filed: Aug. 3, 1992

[51] Int. Cl.⁵ .............................................. G08G 1/04
[52] U.S. Cl. ................................. 307/10.1; 359/602; 359/604; 359/843; 359/844; 307/10.7; 307/10.8
[58] Field of Search ............................ 359/602-604, 359/843, 844, 854, 871; 307/10.1, 10.7, 10.8; 364/424.05; 340/901, 903

[56] References Cited

U.S. PATENT DOCUMENTS

| | | | |
|---|---|---|---|
| 2,988,957 | 6/1961 | Kotora, Jr. | 88/93 |
| 3,166,630 | 1/1965 | Esslinger | 88/86 |
| 3,208,343 | 9/1965 | Prochnow | 88/86 |
| 3,527,528 | 9/1970 | McKee et al. | 350/307 |
| 3,536,382 | 10/1970 | McKee et al. | 350/307 |
| 3,640,608 | 2/1972 | McKee et al. | 350/307 |
| 3,640,609 | 2/1972 | McKee et al. | 350/307 |
| 3,681,750 | 8/1972 | Laska | 340/16 R |
| 3,749,480 | 7/1973 | DeWit et al. | 350/289 |
| 3,761,164 | 9/1973 | McKee et al. | 350/307 |
| 3,950,080 | 4/1976 | McKee et al. | 350/307 |
| 4,609,265 | 9/1986 | McKee et al. | 350/605 |
| 4,694,295 | 9/1987 | Miller et al. | 340/903 |
| 4,792,220 | 12/1988 | Janowicz | 350/637 |
| 4,798,967 | 1/1989 | Yamana et al. | 307/10 R |
| 4,864,298 | 9/1989 | Dombrowski | 340/904 |
| 5,126,885 | 6/1992 | Gray | 359/841 |

FOREIGN PATENT DOCUMENTS

88/04619  6/1988  World Int. Prop. O. .

Primary Examiner—A. D. Pellinen
Assistant Examiner—Aditya Krishnan

[57] ABSTRACT

A system for automatically controlling the position of a tractor-trailer rearview mirror to maintain unobstructed vision in the mirror during turns employs a pair of ultrasonic transducers mounted on the external rear wall of the tractor on opposite sides of the centerline thereof so as to project ultrasonic sound beams onto the forward wall of the trailer. A control circuit determines the difference in the two path lengths, indicating the degree of turning of the vehicle, to generate control signals to a mirror rotating motor. A third transducer may be mounted for rotation with the mirror and directs an ultrasonic beam along the zone immediately beside the trailer for detecting persons or objects within the zone and actuating an alarm in the event of such detection.

8 Claims, 3 Drawing Sheets

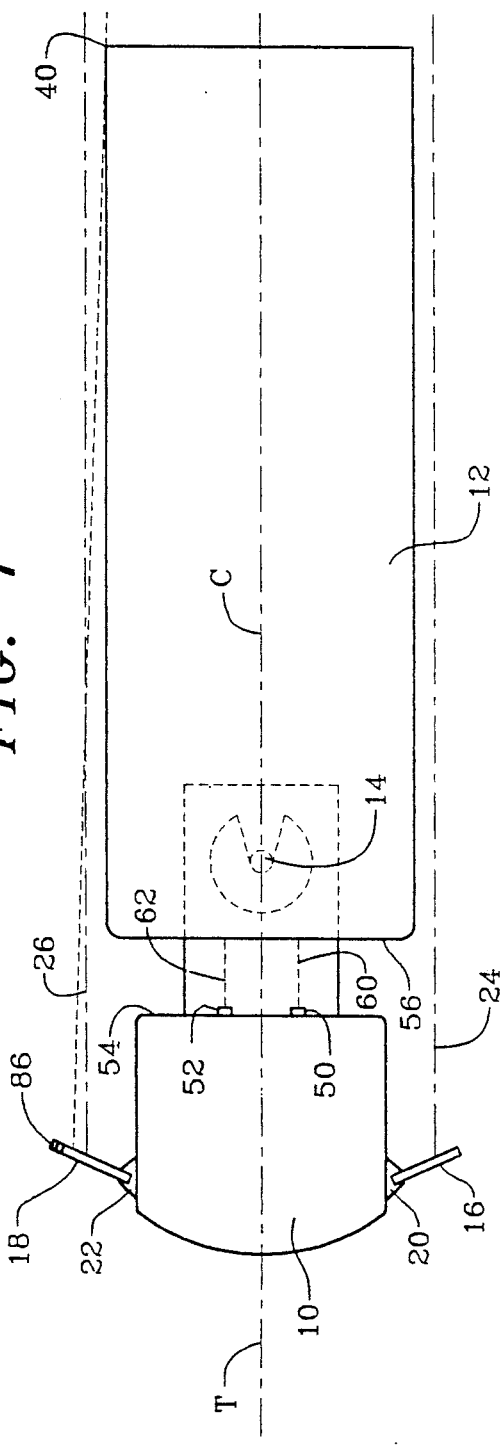
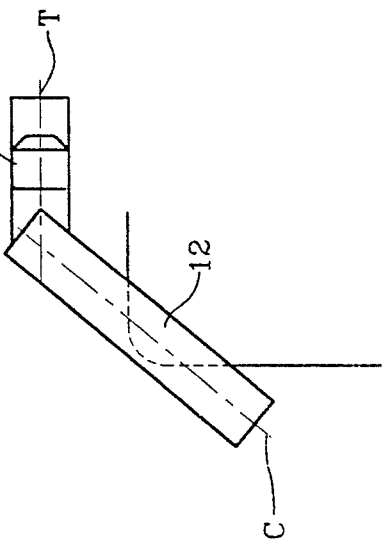
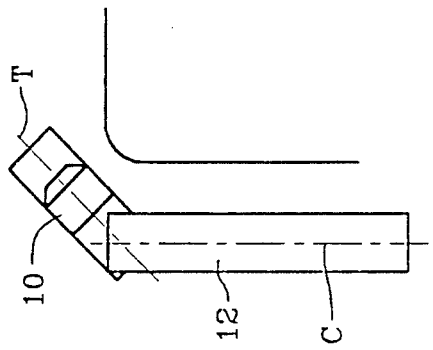
FIG. 1
FIG. 3
FIG. 2

REAR VIEW MIRROR POSITIONING AND ALERTING APPARATUS

The present invention pertains to adjustable rear view mirrors for vehicles such as tractor trailers and, more particularly, to apparatus for automatically adjusting the mirror to maintain a clear field of vision during turning maneuvers and for detecting the presence of an individual or object in proximity to the side of the vehicle and alerting the driver to the presence of such individual or object.

BACKGROUND OF THE INVENTION

Tractors used for pulling semi-trailers are commonly equipped with two external rear view mirrors, these mirrors generally being rectangular and mounted on brackets extending laterally from opposite sides of the tractor cab with provision for at least direct manual adjustability about the vertical axes of the mirrors to provide the driver with views rearwardly along the sides of the trailer. When a tractor trailer turns, the tractor rotates relative to the trailer about the fifth wheel and, with the conventional fixed position rear view mirror installations, the lines of sight of the mirrors likewise rotate relative to the trailer so that the mirror on the side of the turn is aimed toward the side of the trailer, preventing the driver from viewing completely the area to that side of the trailer. Due to the greater distance between the driver and the right or off side mirror than that to the left mirror, the field of view provided by the right mirror is quite narrow, about 2°, and, consequently, the problem of obstructed rear vision on this side during turning maneuvers is of particular concern.

In order to overcome this problem, a number of mirror positioning systems have been devised. Among these are driver actuated remote positioning systems such as those shown in U.S. Pat. Nos. 4,792,220, Janowicz and 4,798,967, Yamana et al. A disadvantage of such systems, however, is that their operation requires the driver to divert attention from steering and watching conditions forward and lateral of the vehicle. Positioning systems for automatically rotating the mirror in response to changes in the angular relation of the trailer to the tractor eliminate the requirement of driver intervention. These systems include ones employing mechanical linkages, for example, the systems disclosed in U.S. Pat. Nos. 2,988,957, Kotora, Jr.; 3,166,630, Esslinger; 3,208,343, Prochnow; 3,527,528, McKee et al.; 3,536,382, McKee et al.; 3,640,608, McKee et al.; 3,761,164, McKee et al. and 3,950,080, McKee et al., and ones having rotation sensors and electrical controls for mirror rotation, examples of which are shown in U.S. Pat. Nos. 3,469,901, Cook et al.; 3,749,480, De Witt et al. and 4,609,265, McKee et al. The relative complexity of these latter systems, the requirement of modification of either or both the tractor and the trailer and the loss of flexibility in the use of a given tractor with many trailers have limited the adaption of such systems.

When a tractor trailer is turning, the trailer does not directly follow the path the tractor. Rather, the rear wheels of the trailer follow a path offset in the direction of the turn so that there is lateral movement of the trailer in this direction and this effect is more pronounced with longer trailers. This trailer lateral movement poses a serious risk of accident resulting from collision of the side of the trailer with an individual or object in the area in close proximity to the turning side of the tractor trailer. Rear view mirror systems which automatically rotate the mirrors to maintain vision along the side of the trailer during turning are of some value in preventing such accidents. However, during a turning maneuver the truck driver's attention is normally directed primarily to conditions forward and to the opposite side from the turn of the vehicle and serious accidents have occurred when, for example, another motorist or a bicyclist has attempted to overtake the tractor trailer on the turning side or a pedestrian has stepped in to the path of travel of the turning trailer. Among the precautions now taken against such accidents is the use of a placard displayed on the rear of the trailer bearing a legend such as "CAUTION! THIS VEHICLE MAKES WIDE TURNS!" Such a warning is of only limited value. Auxiliary convex mirrors are also used to provide increased rearward vision but such a mirror severely distorts the perspective of the image, limiting its effectiveness.

It is the primary object of the present invention to provide a positioning system for a rear view mirror of a tractor which automatically rotates the mirror to provide clear vision along the side of an attached trailer at all times.

It is also an object of the present invention to provide such a mirror positioning system which is self-contained in that the system does not require either mechanical linkage or electrical signal connections between the tractor and the trailer or with the steering mechanism of the tractor.

A further object of the invention is the provision, in conjunction with a rear view mirror of a tractor-trailer, of means for alerting the driver of any intrusion into the zones to the sides of the trailer.

SUMMARY OF THE INVENTION

The above and other objects of the invention which will become apparent hereinafter are achieved by the provision of apparatus for automatically positioning a rear view mirror externally mounted on a trailer pulling tractor which apparatus includes a motor for rotating the mirror about a vertical axis; a pair of transducers, preferably of the acoustic type, mounted in spaced relation to one another on the exterior rear wall of the tractor cab and oriented so as to project beams onto the forward face of the trailer; a control circuit responsive to the output signal of the transducers representing the reflected sound beams for actuating the motor; and a power source for the motor, transducer and control circuit. A third transducer, also preferably of the acoustic type, is mounted in proximity with the mirror for movement therewith and projects a beam rearwardly in generally parallel relationship to the side of the trailer. The control circuit also analyzes the output signals of the third transducer to detect reflected pulses representing objects in proximity to the side of the trailer and actuate an alarm, preferably audible, in response thereto.

For a more complete understanding of the invention and the objects and advantages thereof, reference should be had to the accompanying drawings and the following detailed description wherein a preferred embodiment of the invention is illustrated and described.

DESCRIPTION OF THE DRAWINGS

In the drawings:

FIG. 1 is a schematic top plan view of a tractor-trailer;

FIGS. 2 and 3 are schematic top plan views illustrating the paths of movement of the tractor and the trailer during a right hand turn;

DESCRIPTION OF THE PREFERRED EMBODIMENT

Figure 4:
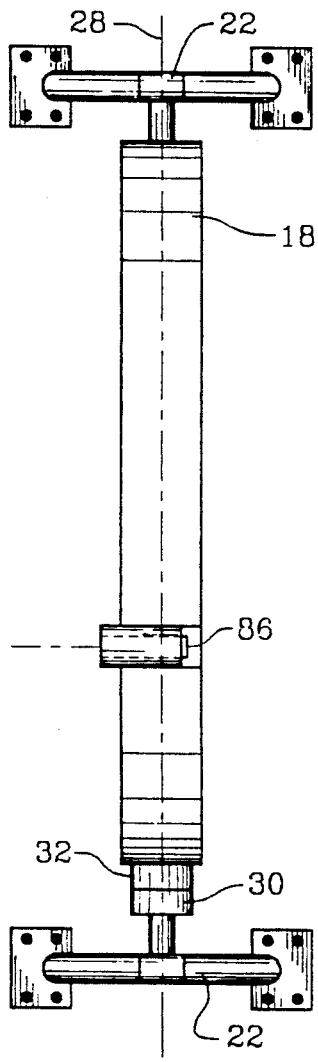
FIG. 4 is an elevational view of the rear view mirror unit of the present invention.

Referring to FIG. 1, a tractor 10 is shown coupled to a semi-trailer 12 by a fifth wheel connection 14. The tractor is provided with left and right external rear view mirror units 16, 18 supported by brackets 20, 22 with the mirrors being positioned at acute angles to the longitudinal axis C of the tractor so as to provide the driver with lines of vision 24, 26 extending rearwardly, parallel to and outwardly offset from the sides of the trailer 25 when the longitudinal axis T of the trailer is coincident with the tractor axis C, as is the case when the vehicle is moving in a straight line. While standard tractor rear view mirrors are manually adjustable to allow the driver to initially set the mirror angles, such mirrors are not readily adjustable during operation of the vehicle. When a tractor trailer executes a turn, the tractor rotates relative to the trailer about the axis of the fifth wheel and, if the rear view mirrors remain in fixed position relative to the tractor, the lines of sight of these mirrors likewise rotate relative to the trailer with the result that vision in the mirror on the side of the turn is blocked by the side of the trailer body. As the distance between the driver and the right mirror is greater than that to the left mirror, the angle of the field of vision afforded by the right mirror is considerably narrower than that of the left mirror with the result that obstruction of vision in the right rear view mirror is of particular concern. In the following description of the automatic mirror positioning apparatus of the present invention, the apparatus is described for use in conjunction with the right, exterior rear view mirror. It will be appreciated, however, that the left rear view mirror may be similarly equipped, if desired.

As is shown in FIG. 4, the rear view mirror 18 is supported for rotation about its vertical axis 28 by the brackets 22, a drive mechanism 30 including a reversable electric motor 32 effecting mirror rotation. Such mirror rotating mechanisms are well-known.

The mirror position control system includes a pair of transducers 50, 52 which are mounted on the exterior rear wall 54 of the cab of the tractor, these transducers preferably being of the ultrasonic type, for example, that sold by the Polaroid Corporation and identified by part No. 6604142. In the arrangement shown in FIG. 1, the two transducers are mounted in horizontal alignment and equispaced on opposite sides of the longitudinal axis C of the tractor. The radiated ultrasonic beams 60, 62 of the transducers are directed rearwardly, parallel to the axis C, onto the front wall 56 of the trailer 12. When the tractor and trailer are moving in a straight line, the path lengths of the two beams 60, 62 are equal while, during turning movements, the path length on the side to which the tractor is turning is shortened while the other path length increases. This difference in the two path lengths is employed to control the position of the mirror.

Figure 5:
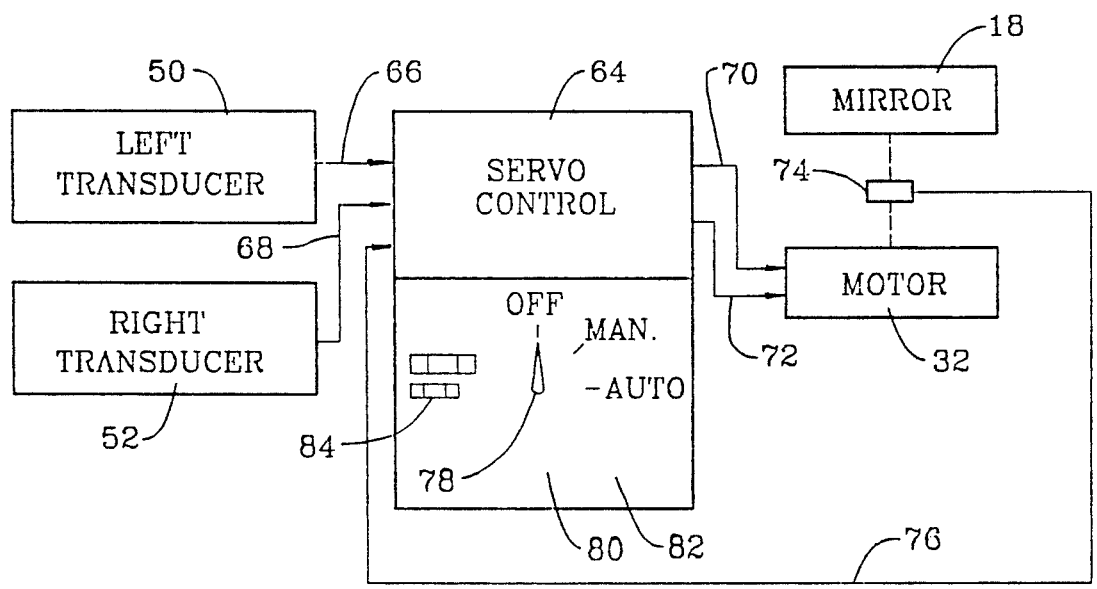
FIG. 5 is a block diagram of the control circuit of the rear view mirror position control unit.

A schematic showing of the mirror positioning circuitry is shown in FIG. 5. The arrangement includes a servo control 64 which receives as control inputs the output signals of the transducers 50 and 52 over lines 66 and 68, respectively and the output signal of an angle transducer 74 over line 76, the angle transducer signal representing the mirror position, the servo control furnishing signals over lines 70 and 72 for actuating the motor 32. A control switch 78 is provided with "Off", "Manual" and "Automatic" positions. In the "Manual" position, the mirror position is controlled by switches 80 and 82 for rotating the mirror to the left or the right, respectively, allowing the driver to initially adjust the mirror position as desired. The amount of rotation of the mirror required to maintain a clear line of vision during turning movements is a function of both the degree of the turn and of the length of the trailer. As many tractors pull trailers of different lengths at different times, an input device 84 may also be provided for inputting to the servo control the length of the trailer.

In use of the control system of the present invention, the driver initially adjusts the mirror position manually by means of the switches 80 and 82 to the desired position for clear vision when the tractor and trailer are is straight line relationship, thus establishing the neutral or home position of the mirror. During a turning movement, the servo control 64 senses the angle of the turn, as indicated by the signals on lines 66 and 68 from the transducers 50 and 52 and calculates the direction and angle of mirror rotation required, considering the length of the trailer, to maintain a clear sight line along the side of the trailer.

Figure 6:
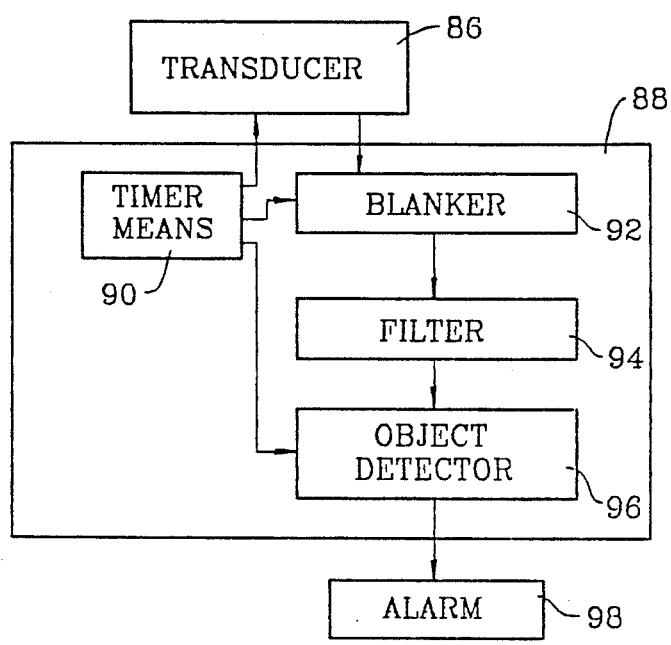
FIG. 6 is a block diagram of the control circuit of the intrusion alerting unit.
Figure 7:
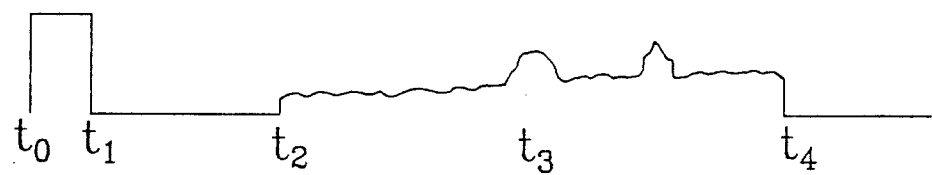
FIG. 7 is a graphic showing of the transmitted and typical reflected pulses utilized in the intrusion alerting control circuit.

In order to alert the tractor driver in the event a person or object is in the zone along the side of the trailer into which the trailer will move during a turn, a third ultrasonic transducer 86 is mounted on the mirror assembly so as to rotate with the mirror and oriented to project a beam parallel to the line of vision rearwardly from the mirror. As is shown in FIG. 6, the transducer 86 provides an input to a control circuit 88. The circuit 88 includes timing means 90 which energizes the transducer to generate untrasonic pulses at spaced time intervals. A typical sequence of transmitted and received pulse signals is shown in FIG. 7. Under control of the timing means 90, the transducer emits a pulse for a short time interval $t_1 - t_0$. As the first reflected pulses received by the transducer represent reflections many from the front end of the trailer and, thus, are not of concern, the output signal of the transducer is suppressed by a blanker circuit 92, also under control of the timing means, until time $t_2$ at which the reflected signal represents reflected sound waves received from the zone extending along the side of the trailer. The output of the blanker circuit is supplied to filer 94 which differentiates, that is, which passes only those portions of the signal which have high rates of rise or decay. The filter furnishes a signal to object detector 96, also responsive to timing means 90, which is operative to output an output signal in the event a signal is received from the filter before time $t_4$, representing the reflected signal from the rear corner of the trailer. Such a signal, for example at time $t_3$, represents a reflection from a person or object within the zone in which there is danger of a side-swipe. The output signal of object detector 96 actuates an alarm 98, preferably audible, to alert the driver. The alarm may be actuated either for a fixed time interval or continuously until cancelled by the driver.

With the exception of the tractor-mounted transducers, the control and input switches and the alarm, the electronics of the positioning and alerting systems may be integrated into the mirror housing thus providing a compact, self-contained unit. The system is, preferrably powered from the tractor power supply.

While a preferred embodiment of the invention has been illustrated and described in detail herein, it will be understood that changes and additions may be had therein and thereto without departing from the spirit of the invention. Reference should, accordingly, be had to the appended claims in determining the true scope of the invention.

I claim:

1. Apparatus for adjusting the position of an external rearview mirror mounted on a tractor of the type used to pull a semi-trailer, the mirror being mounted for rotation about a vertical axis, comprising:
   a controllable drive mechanism connected to the mirror including an electric motor operable to rotate the mirror in either direction about the vertical axis thereof;
   first and second ultrasonic transducers mounted on the exterior rear wall of the tractor on opposite sides of the longitudinal centerline of the tractor so as to project ultrasonic sound beams rearwardly onto the front wall of the trailer and to detect the reflections of said ultrasonic sound beams from said trailer front wall; and
   circuit means for determining the difference in path length detected by said first and said second transducers and for generating control signals to said drive mechanism in accordance with the difference to effect rotation of the mirror.

2. The apparatus of claim 1 wherein said circuit means further includes switch means permitting manual adjustment of the position of said mirror.

3. The apparatus of claim 1 further including
   a third ultrasonic transducer mounted for rotation with said mirror and positioned to project an ultrasonic sound beam in substantially parallel relation to the driver's line of sight in the zone along the side of the trailer and for detecting reflections of said lastmentioned ultrasonic sound beam;
   an alarm; and
   additional circuit means responsive to said third ultrasonic transducer and operative to actuate said alarm upon reception of a reflection indicative of the presence of a person or object within said zone.

4. Apparatus for adjusting the position of an external rearview mirror mounted on a tractor of the type used to pull a semi-trailer, the mirror being mounted for rotation about a vertical axis, comprising:
   a controllable drive mechanism connected to the mirror including an electric motor operable to rotate the mirror in either direction about the vertical axis thereof;
   first and second acoustic transducers mounted on the exterior rear wall of the tractor on opposite sides of the longitudinal centerline of the tractor so as to project acoustic sound beams rearwardly onto the front wall of the trailer and to detect the reflections of said acoustic sound beams from said trailer front wall; and
   circuit means for determining the difference in path length detected by said first and said second transducers and for generating control signals to said drive mechanism in accordance with the difference to effect rotation of the mirror.

5. The apparatus of claim 4 wherein said circuit means further includes switch means permitting manual adjustment of the position of said mirror.

6. The apparatus of claim 4 further including
   a third acoustic transducer mounted for rotation with said mirror and positioned to project an acoustic sound beam in substantially parallel relation to the driver's line of sight in the zone along the side of the trailer and for detecting reflections of said lastmentioned acoustic sound beam;
   an alarm; and
   additional circuit means responsive to said third acoustic transducer and operative to actuate said alarm upon reception of a reflection indicative of the presence of a person or object within said zone.

7. Apparatus for controlling the position of an external rearview mirror mounted on a tractor of the type used to pull a semi-trailer so as to maintain a clear line of vision in said mirror during turning movements of the tractor and semi-trailer, said mirror being mounted for rotation about a vertical axis, comprising:
   a reversible electric motor connected to said mirror to effect rotation thereof about said vertical axis;
   acoustic transducer sensing means mounted on the exterior rear wall of said tractor for determining the angular relationship between said tractor and said semi-trailer; and
   control circuit means responsive to said sensing means and operative to control rotation of said motor in response thereto.

8. The apparatus of claim 7 further including an alarm, an additional acoustic transducer means connected to said mirror for rotation therewith and operative to detect the presence of a person or object in a zone along the side of said trailer, and additional control means response to said additional acoustic transducer means and operative to actuate said alarm upon detection of such presence.

* * * * *